US011767865B1

(12) United States Patent
Belokin

(10) Patent No.: US 11,767,865 B1
(45) Date of Patent: Sep. 26, 2023

(54) CLIP FOR A SUCTION CUP

(71) Applicant: Displays by Martin Paul, Inc.—Creative Center, Denton, TX (US)

(72) Inventor: Martin P. Belokin, Denton, TX (US)

(73) Assignee: Displays by Martin Paul, Inc.—Creative Center, Denton, TX (US)

( * ) Notice: Subject to any disclaimer, the term of this patent is extended or adjusted under 35 U.S.C. 154(b) by 0 days.

(21) Appl. No.: 17/719,179

(22) Filed: Apr. 12, 2022

(51) Int. Cl.
*A47G 1/17* (2006.01)
*F16B 2/20* (2006.01)

(52) U.S. Cl.
CPC . *F16B 2/20* (2013.01); *A47G 1/17* (2013.01)

(58) Field of Classification Search
None
See application file for complete search history.

(56) References Cited

U.S. PATENT DOCUMENTS

| | | | | |
|---|---|---|---|---|
| 3,955,296 A * | 5/1976 | Kapstad | ............. | G09F 3/16 40/658 |
| 4,895,094 A * | 1/1990 | Carlstedt | ............. | B63B 59/02 114/364 |
| 5,117,537 A * | 6/1992 | Hunter | ............. | E04H 15/64 24/72.5 |
| 6,131,865 A * | 10/2000 | Adams | ............. | A47G 1/17 248/205.5 |
| D830,813 S * | 10/2018 | Garfinkle | ............. | D8/354 |
| 10,203,001 B2 * | 2/2019 | White | ............. | F16B 47/00 |
| D957,234 S * | 7/2022 | Limber | ............. | D8/367 |
| 2001/0040202 A1* | 11/2001 | Adams, IV | ............. | F16B 47/00 248/206.2 |
| 2010/0148025 A1* | 6/2010 | Belokin | ............. | A47F 5/0807 248/206.2 |
| 2012/0308763 A1* | 12/2012 | Chen | ............. | A47G 1/17 428/78 |
| 2018/0245716 A1* | 8/2018 | Nijdam | ............. | F16B 2/246 |

* cited by examiner

*Primary Examiner* — Steven M Marsh
(74) *Attorney, Agent, or Firm* — Loveless Law Group; Ryan Loveless

(57) ABSTRACT

A clip to facilitate a coupling of an object to a suction cup includes a body having a first surface and a second surface disposed opposite to the first surface. The body defines an opening extending from the first surface to the second surface. The clip also includes a tongue adapted to engage with the suction cup and extending inside the opening from the body. The tongue includes a first end attached to the body and a second end arranged at a gap from the body.

18 Claims, 4 Drawing Sheets

CLIP FOR A SUCTION CUP

TECHNICAL FIELD

This disclosure is generally directed to clips. More specifically, the present disclosure pertains to clips suitable to couple objects with suction cups to mount the object on substantially flat surfaces, such as, walls.

BACKGROUND

Display shelves, storage bins, and racks that are mounted on a wall are gaining popularity to enable display or various articles. This arrangement saves a lot of floor space and provides improved accessibility and ergonomics. Additionally, the wall mounted objects provide a systemization to the room and workplaces. For mounting these objects on a wall, or a glass surface, suction cups are generally used. However, often is difficult to engage the suction cups with these objects, and require special and costly mounting devices, which is undesirable.

SUMMARY

A clip has been disclosed that facilitates a mounting/coupling of an object, for example, display shelf, a banner, etc., to a suction cup to enable a hanging of the object to a flat surface. The clip includes a body having a first surface and a second surface disposed opposite to the first surface. The body defines an opening extending from the first surface to the second surface. The also clip includes a tongue adapted to engage with the suction cup and extending inside the opening from the body. The tongue includes a first end attached to the body and a second end arranged at a gap from the body.

A suction cup assembly is also disclosed that enables a mounting an object, for example, a display shelf, a banner, etc., to a vertically extending surface. The suction cup assembly includes a suction cup is adapted to be engaged with the flat surface, and a clip adapted to be removably engaged with the suction cup and facilitate a coupling of the object with the suction cup. The clip includes a body having a first surface and a second surface disposed opposite to the first surface. The body defines an opening extending from the first surface to the second surface. The clip also includes a tongue adapted to engage with the suction cup and extending inside the opening from the body. The tongue includes a first end attached to the body and a second end arranged at a gap from the body.

Additionally, it should be understood that while certain advantages may be described with reference to certain embodiments, other embodiments may have some or none of such advantages.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
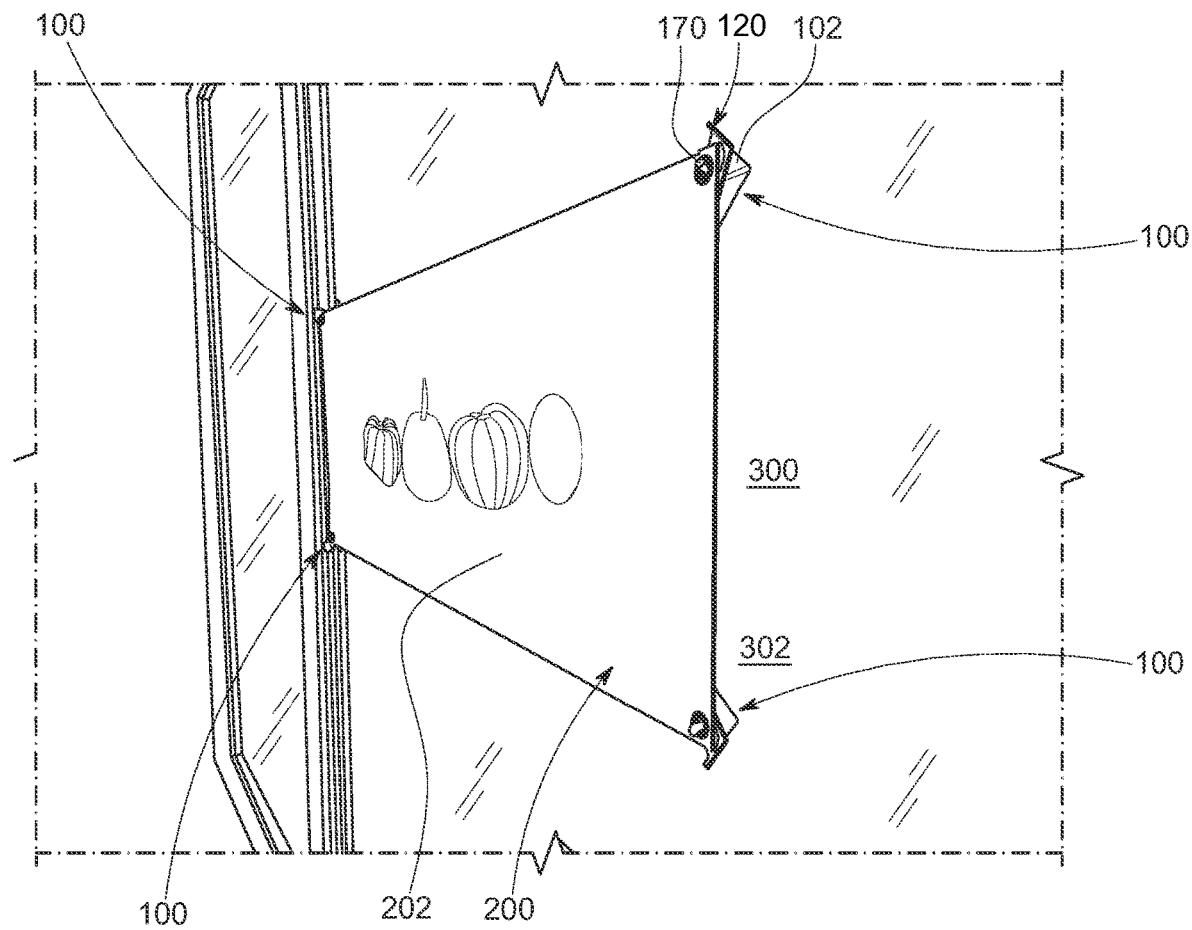
FIG. 1 illustrates an object mounted to a glass wall using a plurality of suction cup assemblies, in accordance with an embodiment of the disclosure.

The FIGURES described below, and the various embodiments used to describe the principles of the present disclosure in this patent document are by way of illustration only and should not be construed in any way to limit the scope of the disclosure. Those skilled in the art will understand that the principles of the present disclosure invention may be implemented in any type of suitably arranged device or system. Additionally, the drawings are not necessarily drawn to scale.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments.

Additionally, it should be understood that while certain advantages may be described with reference to certain embodiments, other embodiments may have some or none of such advantages.

Referring to FIG. 1, a plurality of suction cup assemblies 100, four suction cup assemblies 100, mounting an object 200, for example, a calendar or banner 202, on a flat surface 300, for example, a glass wall surface 302, is shown. In an embodiment, the flat surface may be a wall, a door, a window, etc. Although four suction cup assemblies 100 are shown and contemplated for mounting the object 200 on the flat surface 300, it may be appreciated that any number of suction cup assemblies 100, for example, a single suction cup assembly 100 may be utilized for mounting the object 200 on the flat surface 300. As shown in FIG. 1, the suction cup assembly 100 includes a suction cup 102 engaged to the glass wall surface 302 and a clip 120 removably coupled to the suction cup 102 and the object 200.

Figure 2:
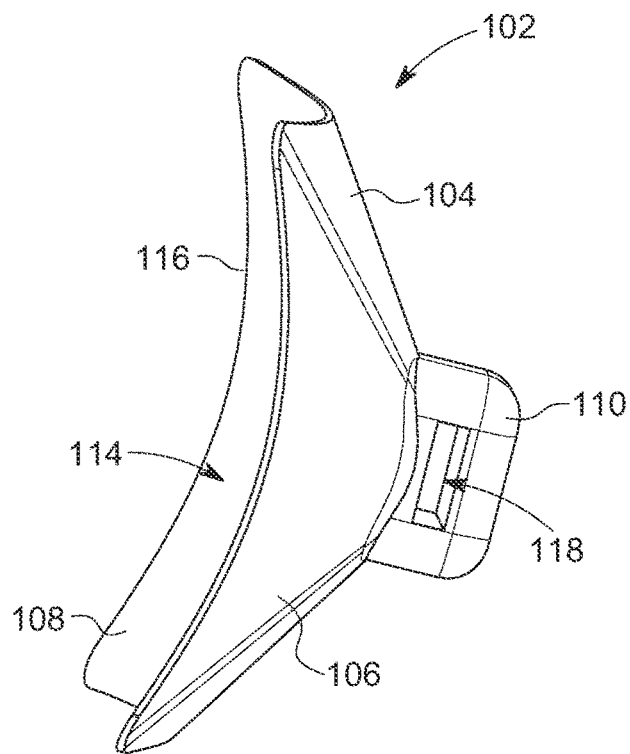
FIG. 2 illustrates a suction cup of the suction cup assembly of FIG. 1, in accordance with an embodiment of the disclosure.

Referring to FIG. 2, the suction cup 102 includes a cup body 104 having an outer surface 106, and an inner surface 108 adapted to engaged with flat surface 300, and a post 110 engaged to the cup body 104 and centrally located on the outer surface 106 of the cup body 104. The cup body 104 facilitates an engagement of the suction cup 102 with the flat surface 300. In the relaxed (normal) state, as shown in FIG. 2, the inner surface 108 of the cup body 104 is concave and defines an internal cavity 114. To engage the suction cup 102 with the flat surface 300, outer edges 116 of the cup body 104 is abutted to the flat surface 300 and the cup body 104 is compressed. When the cup body 104 is compressed to expel air from the internal cavity 114, the normal tendency of the cup body 104 to return to its relaxed condition creates a lowered pressure inside the cavity 114 and, so long outer edges 116 of the cup body 104 remain sealed against the flat surface 300, the suction cup 102 remains adhered to the flat surface 300. However, if sealing contact is disrupted at the outer edges 116 of cup body 104, air leaks into the internal cavity 114 and adherence is lost.

The post 110 enables/facilitates the engagement/attachment/coupling of the suction cup 102 and the clip 120. To enable the attachment of the clip 120 with the suction cup 102, the post 110 defines an elongated channel 118 as an engagement structure to receive a portion of the clip 120.

Figure 3:
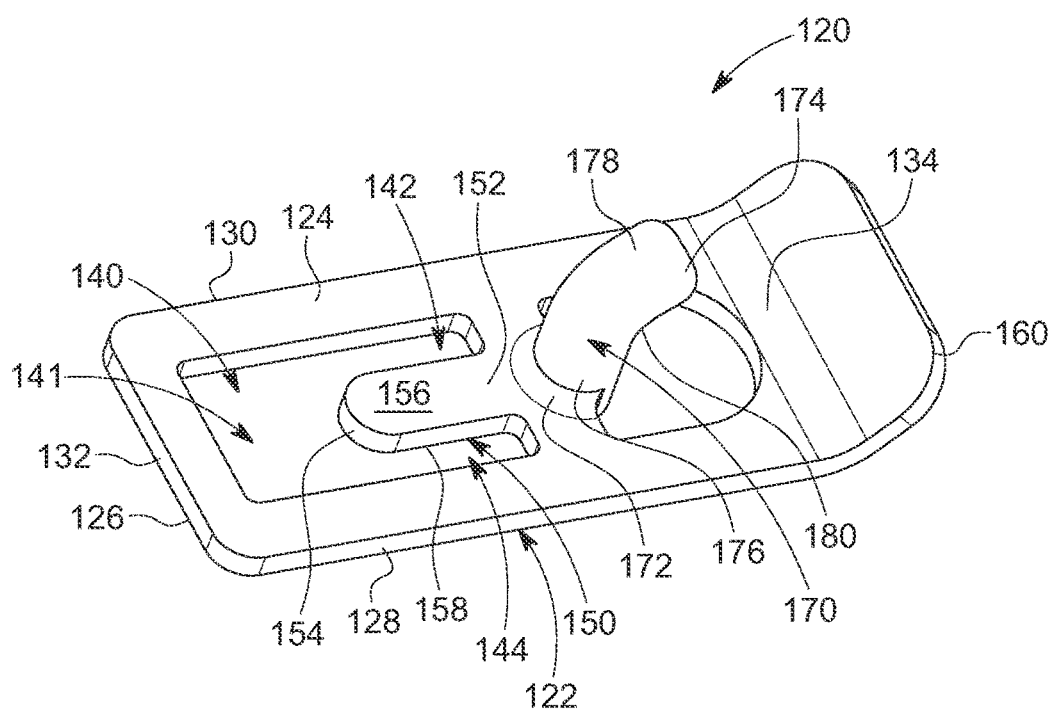
FIG. 3 illustrates a clip of the suction cup assembly of FIG. 1, in accordance with an embodiment of the disclosure.

Referring to FIG. 3, the clip 120 includes a substantially flat body 122, for example, a rectangular plate, having a first surface 124 and a second surface 126 arranged opposite to the first surface 124. The body 122 may include at least one outer edge, for example, a first longitudinal edge 128, a second longitudinal edge 130 arranged opposite to the first longitudinal edge 128, a first lateral edge 132 connecting the first longitudinal edge 128 to the second longitudinal edge 130, and a second lateral edge 134 arranged opposite to the first lateral edge 132 and connecting the first longitudinal edge 128 and the second longitudinal edge 130. In an embodiment, the first longitudinal edge 128 and the second longitudinal edge 130 may extend substantially parallel to each other and may be arranged substantially perpendicular to the first lateral edge 132 and the second lateral edge 134. Also, the first lateral edge 132 and the second lateral edge 134 may extend substantially parallel to each other. It may be appreciated that lengths of the longitudinal edges 128, 130 may be larger than lengths of the lateral edges 132, 134.

Moreover, the body 122 defines an opening 140 extending from the first surface 124 to the second surface 126. The opening 140 may be arranged proximate to a first lateral edge 132 of the body 122. Further, the clip 120 includes a tongue 150 extending inside the opening 140 from the body 120. The tongue 150 includes a first end 152 attached to the body 122, and a second end 154 (i.e., free end 154) arranged at a gap 141 from the body 122. As shown, the tongue 150 extends in a longitudinal direction from the body 122, with the first end 152 of the tongue 150 arranged distally from the first lateral edge 132 of the body 122 relative to the second end 154 of the tongue 150. Also, the tongue 150 is arranged substantially centrally to the opening 140 in a widthwise direction. Accordingly, a first elongated gap 142 of the opening 140 and a second elongated gap 144 of the opening 140 are defined on two sides of the tongue 150. The tongue 150 may be adapted to flex relative to the body 122 and facilitates an engagement of the clip 120 with the suction cup 102. The tongue 150 is adapted to extend inside the elongated channel 118 of the suction cup 102 to engage/attach/couple the clip 120 with the suction cup 102. Further, for attaching the clip 120 and the suction cup 102, the tongue 150 is flexed outwardly of the opening 140, and inserted inside the elongated channel 118 of the suction cup 102. Also, in the engagement of the suction cup 102 with the clip 120, the post 110 extends through the opening 140. It may be appreciated that in the unflexed state/position of the tongue 150, a first surface 156 of the tongue 150 may be aligned and coplanar with the first surface 124 of the body 122, and a second surface 158 of the tongue 150 may be aligned and coplanar with the second surface 126 of the body 122.

Further, the clip 120 includes a handle 160 to enable a holding of the clip 120 by a user. As shown, the handle 160 may include a substantially flat plate having a width and a thickness substantially equal to the width and thickness of the body 122. The handle 160 extends outwardly and away from the from the second lateral edge 134 of the body 122, and is arranged at an inclination relative to the body 122. As illustrated, the handle 160 extends obliquely and outwardly from the second lateral edge 134 of body 122. In an embodiment, an angle defined between the handle 160 and the body 122 is an obtuse angle.

Additionally, the clip 120 includes a hook structure 170 attached to the body 122 and extending outwardly from the first surface 124 of the body 122. The hook structure 170 may be disposed between the first end 152 of the tongue 150 and the handle 160. As shown, the hook structure 170 may include a first end 172 attached to the first surface 124 of the body 122 and a second end 174 (i.e., free end 174) arranged away/distally from the first surface 124 of body 122. As shown, the hook structure 170 includes a first portion 176 that may extend substantially perpendicularly to the first surface 124 in a direction away from the first surface 124, and a second portion 178 extending from the first portion 176 to the second end 174 defining a bend 180 therebetween. The hook structure 170 is adapted to engage with the object 200, and retain/hold the object 200 with the clip 120. As shown, the second portion 178 extends in a direction towards the handle 160 from the first portion 176. However, the second portion 178 may extend in other directions as well. To mount the object with the clip 120 and hence the suction cup assembly 100, the object 200 is mounted on the hook structure 170. Accordingly, the clip 120 provides a simple and low-cost device that enables the engagement of the objects 200 with the suction cups 102 to facilitate mounting of the objects on the flat surfaces 300

Figure 4:
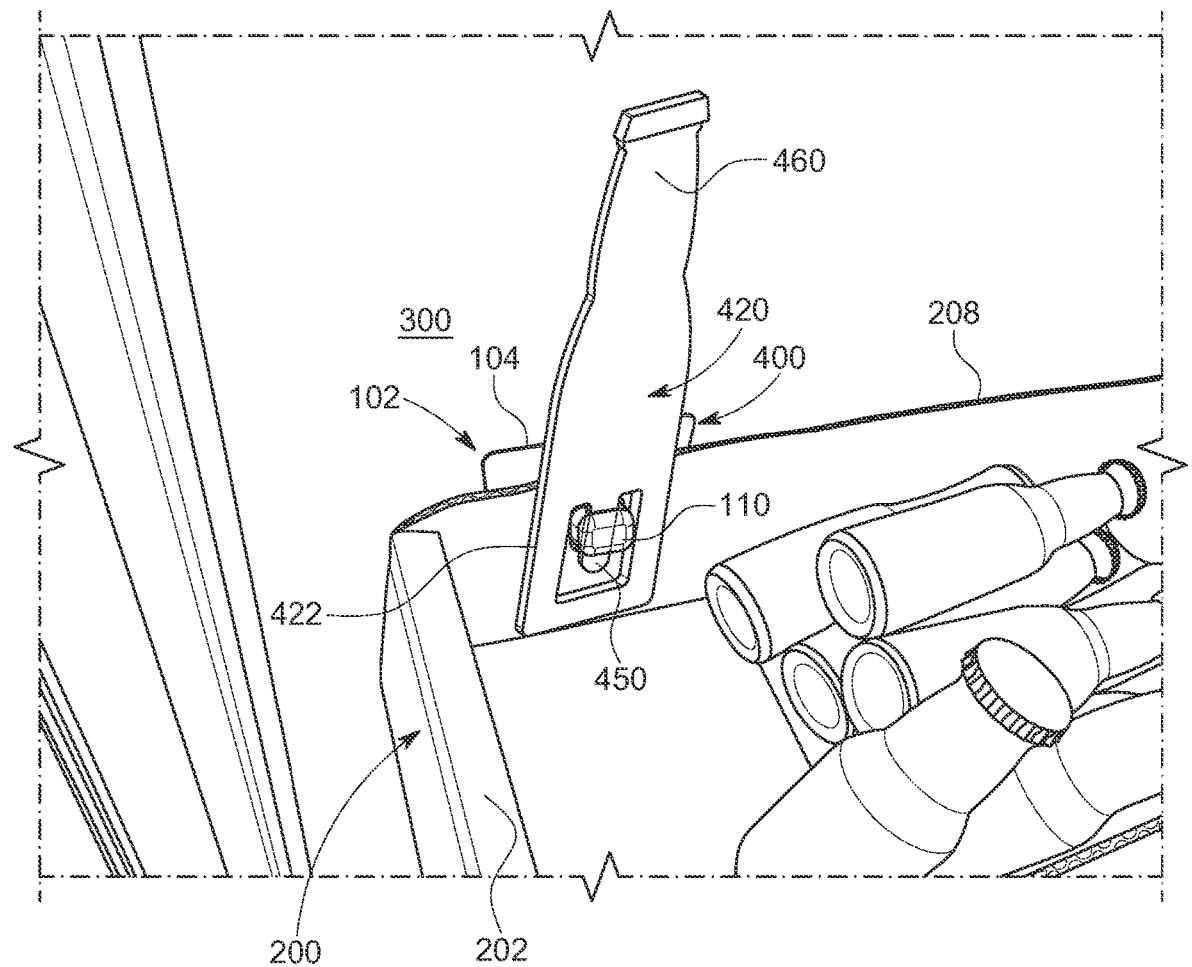
FIG. 4 illustrates an object mounted to a wall via a suction cup assembly, in accordance with an alternative embodiment of the disclosure.

Referring to FIG. 4, a suction cup assembly 400 mounting the object 200, for example, a shelf 204, to the flat surface 300, according to an alternative embodiment is shown. The suction cup assembly 400 includes the suction cup 102 engaged to the flat surface 300 and a clip 420 engaged to the suction cup 102 and the shelf 204.

Figure 5:
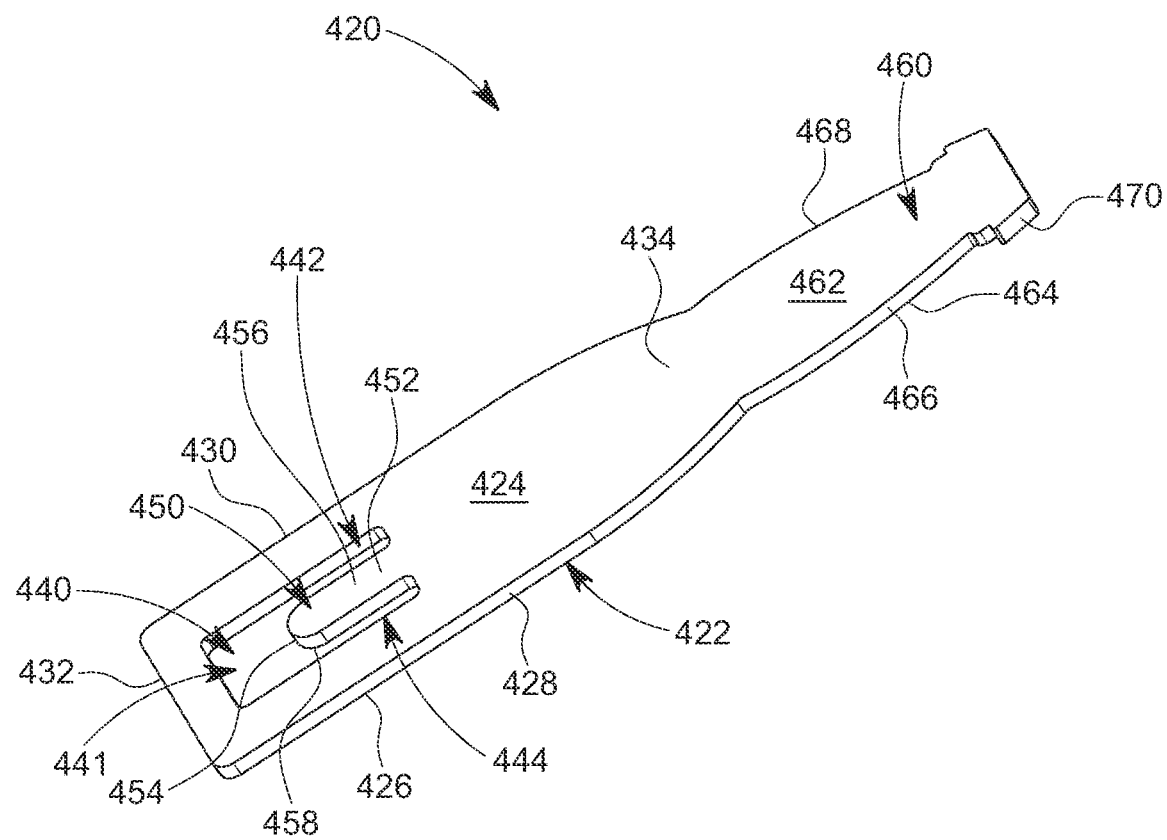
FIG. 5 illustrates a clip of the suction cup assembly of FIG. 4, in accordance with the alternative embodiment of the disclosure.

As shown in FIG. 5, the clip 420 includes a substantially flat body 422, for example, a plate, having a first surface 424 and a second surface 426 arranged opposite to the first surface 424. The body 422 includes a first longitudinal edge 428, a second longitudinal edge 430 arranged opposite to the first longitudinal edge 428, a first lateral edge 432 connecting the first longitudinal edge 428 to the second longitudinal edge 430. Moreover, the body 422 includes a second lateral edge 434 arranged opposite to the first lateral edge 432, connecting the first longitudinal edge 428 to the second longitudinal edge 430. It may be appreciated that lengths of the longitudinal edges 428, 430 may be larger than lengths of the lateral edges 432, 434.

Moreover, the body 422 defines an opening 440 extending from the first surface 424 to the second surface 426, and may be arranged proximate to the first lateral edge 432 of the body 422. Further, the clip 420 includes a tongue 450 extending inside the opening 440 from the body 422. The tongue 450 includes a first end 452 attached to the body 422, and a second end 454 (i.e., free end 454) arranged at a gap 441 from the body 422. As shown, the tongue 450 extends in a longitudinal direction from the body 422, with the first end 452 of the tongue 450 arranged distally from the first lateral edge 432 of the body 422 relative to the second end 454 of the tongue 450. Also, as shown, the tongue 450 is arranged substantially centrally to the opening 440 in a widthwise direction. Accordingly, a first elongated gap 442 and a second elongated gap 444 of the opening 440 are defined on two sides of the tongue 450. The tongue 450 may be adapted to flex relative to the body 422 and facilitate an engagement of the clip 420 with the suction cup 102 and the shelf 204. The tongue 450 is adapted to extend inside the elongated channel 118 of the suction cup 102 to engage/attach/couple the clip 420 with the suction cup 102. Further, for attaching the clip 420 with the shelf 204 and the suction cup 102, the post 112 of the suction cup 102 is inserted through the opening 440 of the clip 420 and inside a hole (not shown) of the shelf 204 such that a wall 208 of the shelf 204 is arranged between the body 422 (i.e., the clip 420) and the cup body 104, and the tongue 450 is flexed outwardly of the opening 440, and inserted inside the elongated channel 118 of the suction cup 102. Accordingly in the engagement of the clip 120 with the suction cup 102 and the shelf 204, the wall 208 of the shelf 204 is arranged between the cup body 104 and the clip 420 with the post 110 extending through the opening 440 and the hole (not shown) of the wall 208, and the tongue 450 extends inside the elongated channel 118 of the post 110 of the suction cup 102. Accordingly, the clip 420 provides a simple and low-cost device that enables the engagement of the objects 200 with the suction cups 102 to facilitate the mounting of the objects on the flat surfaces 300. It may be appreciated that in the unflexed state/position of the tongue 450, a first surface 456 of the tongue 150 may be aligned and coplanar with the first surface 424 of the body 422, and a second surface 458 of the tongue 450 may be aligned and coplanar with the second surface 426 of the body 122.

Further, the clip 420 includes a handle 460 to enable a holding of the clip 420 by a user. As shown, the handle 460 includes a substantially flat plate having a thickness substantially equal to the width and thickness of the body 422. As shown, the handle 460 is integrally formed with the body 422, and extends outwardly and away the from the second lateral edge 434 of the body 422 in a longitudinal direction. As shown, a first surface 462 of the handle 460 may be aligned and coplanar with or substantially parallel to the first surface 424 of the body 422, and a second surface 464 of the handle 460 may be aligned and coplanar with or substantially parallel to the second surface 426 of the body 422. Further, longitudinal edges 466, 468 of the handle 460 may include substantially convex shapes to enable an easy holding of the clip 420 by the user. Moreover, the handle 460 includes a stopper or tab 470 arranged at a free lateral end of the handle 460.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and description the principles of the present disclosure and its practical application, to thereby enable others skilled in the art to best utilize the present disclosure and various embodiments with various modifications as are suited to the particular use contemplated.

What is claimed is:

1. A clip to facilitate a coupling of an object to a suction cup, the clip comprising:
    a body having a first surface and a second surface disposed opposite to the first surface, the body defines an opening extending from the first surface to the second surface; and
    a tongue adapted to engage with the suction cup and extending inside the opening from the body, the tongue including a first end attached to the body and a second end arranged at a gap from the body;
    first and second elongated gaps in the opening of the body, the first and second elongated gaps respectively extending between the tongue and first and second longitudinal edges of the body, and the first and second longitudinal edges forming part of the first and second surfaces of the body;
    wherein a first surface of the tongue is coplanar with the first surface of the body and a second surface of the tongue is coplanar with the second surface of the body in an unflexed position of the tongue.

2. The clip of claim 1 further including a handle connected the body to facilitate a holding of the clip by a user.

3. The clip of claim 2, wherein the handle extends obliquely relative to the body from a lateral edge of the body.

4. The clip of claim 3, wherein the handle extends at an obtuse angle relative to the body.

5. The clip of claim 2, wherein the handle extends away from a lateral edge of the body such that a first surface of the handle is coplanar with the first surface of the body.

6. The clip of claim 1 further including a hook structure adapted hold the object and extending outwardly from the first surface of the body.

7. The clip of claim 6, wherein the hook structure is arranged proximate to the second end of the tongue.

8. The clip of claim 6, wherein the hook structure includes a first portion attached to the first surface of the body and a second portion extending from the first portion defining a bend therebetween.

9. A suction cup assembly to facilitate a mounting of an object to a vertically extending flat surface, the suction cup assembly comprising:
   a suction cup adapted to be engaged with the flat surface; and
   a clip adapted to be removably engaged with the suction cup and facilitate a coupling of the object with the suction cup, the clip includes
      a body having a first surface and a second surface disposed opposite to the first surface, the body defines an opening extending from the first surface to the second surface, and
      a tongue adapted to engage with the suction cup and extending inside the opening from the body, the tongue including a first end attached to the body and a second end arranged at a gap from the body.

10. The suction cup assembly of claim 9, wherein the suction cup includes a cup body adapted to engage with the flat surface and a post engaged to the cup body and defines an elongated channel to receive the tongue to enable the engagement of the clip with the suction cup.

11. The suction cup assembly of claim 9, wherein a first surface of the tongue is coplanar with the first surface of the body and a second surface of the tongue is coplanar with the second surface of the body in an unflexed position of the tongue.

12. The suction cup assembly of claim 9, wherein the clip further includes a handle connected the body to facilitate a holding of the clip by a user.

13. The suction cup assembly of claim 12, wherein the handle extends obliquely from a lateral edge of the body.

14. The suction cup assembly of claim 13, wherein the handle extends at an obtuse angle relative to the body.

15. The suction cup assembly of claim 12, wherein the handle extends away from a lateral edge of the body such that a first surface of the handle is coplanar with the first surface of the body.

16. The suction cup assembly of claim 9, wherein the clip further includes a hook structure adapted to hold the object and extending outwardly from the first surface of the body.

17. The suction cup assembly of claim 16, wherein the hook structure is arranged proximate to the second end of the tongue.

18. The suction cup assembly of claim 16, wherein the hook structure includes a first portion attached to the first surface of the body and a second portion extending from the first portion defining a bend therebetween.

* * * * *